United States Patent
Wiest et al.

(10) Patent No.: US 9,689,728 B2
(45) Date of Patent: Jun. 27, 2017

(54) ULTRASONIC TRANSDUCER AND ULTRASONIC FLOW METER

(71) Applicant: Endress + Hauser Flowtec AG, Reinach (CH)

(72) Inventors: Achim Wiest, Weil am Rhein (DE); Andreas Berger, Hasel-Glashutten (DE)

(73) Assignee: Endress + Hauser Flowtec AG, Reinach (CH)

(*) Notice: Subject to any disclaimer, the term of this patent is extended or adjusted under 35 U.S.C. 154(b) by 0 days.

(21) Appl. No.: 14/787,505

(22) PCT Filed: Apr. 22, 2014

(86) PCT No.: PCT/EP2014/058043
§ 371 (c)(1),
(2) Date: Oct. 28, 2015

(87) PCT Pub. No.: WO2014/177411
PCT Pub. Date: Nov. 6, 2014

(65) Prior Publication Data
US 2016/0103005 A1    Apr. 14, 2016

(30) Foreign Application Priority Data

May 3, 2013   (DE) .......................... 10 2013 104 544

(51) Int. Cl.
*G01F 1/66*    (2006.01)
*G10K 11/00*   (2006.01)

(52) U.S. Cl.
CPC ............ *G01F 1/662* (2013.01); *G10K 11/004* (2013.01)

(58) Field of Classification Search
CPC ........................................................ G01F 1/66
(Continued)

(56) References Cited

U.S. PATENT DOCUMENTS

| 6,508,133 B1 | 1/2003 | Adachi |
| 7,380,469 B2 | 6/2008 | Molenaar et al. |

(Continued)

FOREIGN PATENT DOCUMENTS

| CN | 1204398 A | 1/1999 |
| CN | 102893135 A | 1/2013 |

(Continued)

OTHER PUBLICATIONS

English Translation of International Preliminary Report on Patentability, WIPO, Geneva, Nov. 12, 2015.
(Continued)

*Primary Examiner* — Jewel V Thompson
(74) *Attorney, Agent, or Firm* — Bacon & Thomas, PLLC

(57) ABSTRACT

The invention concerns an ultrasonic transducer, comprising a coupling element which has a first recess, the first recess being provided for the arrangement of a piezoelectric element which feeds an ultrasound signal into the coupling element, and there being disposed between the piezoelectric element and the coupling element an intermediate layer which comprises a metal disc, the metal disc comprising retaining elements (a) each with a first segment lying on the same plane as the metal disc and projecting radially from the perimeter of the metal disc and (b) each having a second segment which adjoins the first segment, projects from the plane of the metal plate and is connected to the first segment.

8 Claims, 3 Drawing Sheets

(58) Field of Classification Search
USPC .......................................... 73/861.25–861.29
See application file for complete search history.

(56) References Cited

U.S. PATENT DOCUMENTS

| | | | |
|---|---|---|---|
| 7,412,902 B2 * | 8/2008 | Wiest | G01F 1/662 |
| | | | 73/861.25 |
| 7,701,118 B2 | 4/2010 | Molenaar et al. | |
| 7,703,337 B1 * | 4/2010 | Feller | G01F 1/662 |
| | | | 73/861.27 |
| 8,408,072 B2 * | 4/2013 | Berger | G01F 1/662 |
| | | | 73/861.28 |
| 8,424,392 B2 | 4/2013 | Kroemer et al. | |
| 8,904,881 B2 | 12/2014 | Sonnenberg | |
| 2013/0061686 A1 | 3/2013 | Fujii et al. | |

FOREIGN PATENT DOCUMENTS

| | | |
|---|---|---|
| DE | 102007039016 A1 | 2/2009 |
| DE | 102010020338 A1 | 11/2011 |
| EP | 0974814 A1 | 1/2000 |
| EP | 1840530 A2 | 10/2007 |
| EP | 2594909 A1 | 5/2013 |
| JP | 2007139607 A | 6/2007 |

OTHER PUBLICATIONS

International Search Report,, EPO, The Netherlands, Jun. 27, 2014.
German Search Report, German PTO, Munich, Jan. 16, 2014.
German Search Report, German PTO, Munich, Jul. 8, 2014.

* cited by examiner

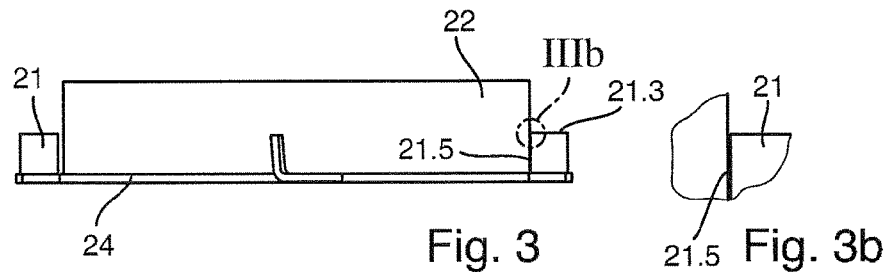
Fig. 3
Fig. 3b
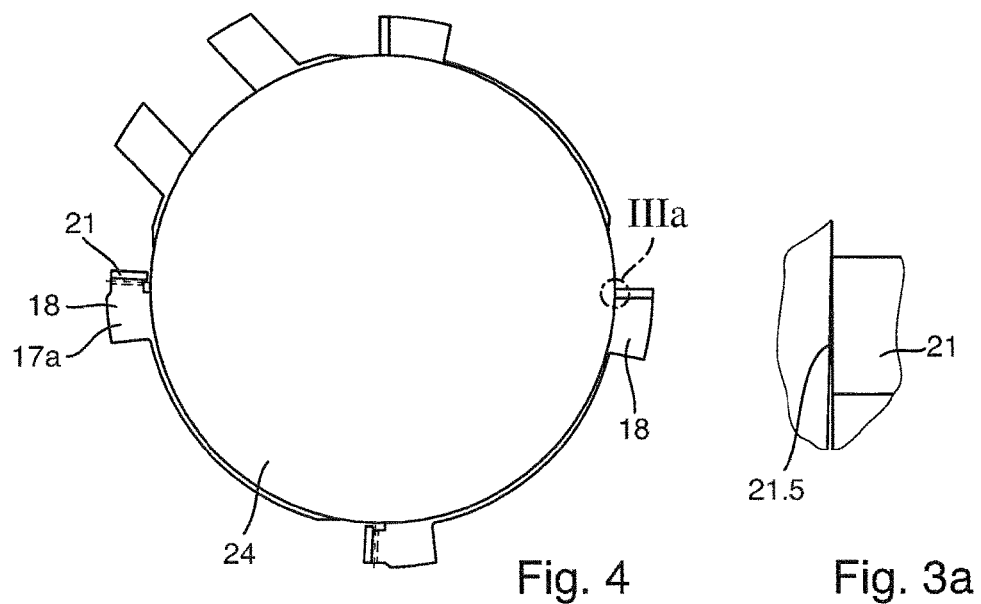
Fig. 4
Fig. 3a
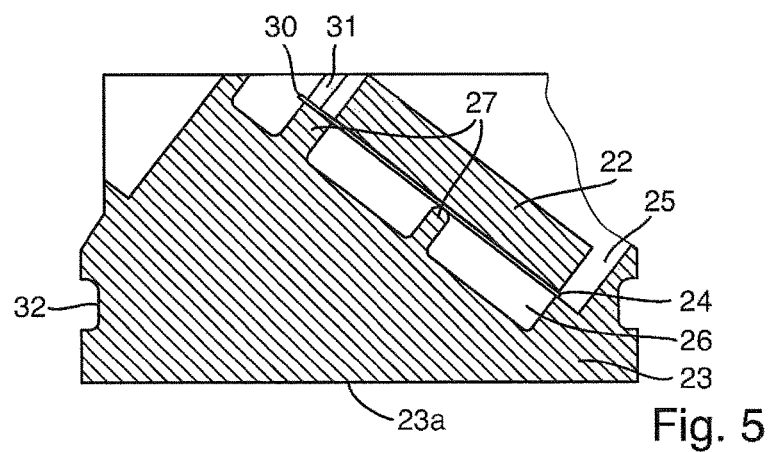
Fig. 5

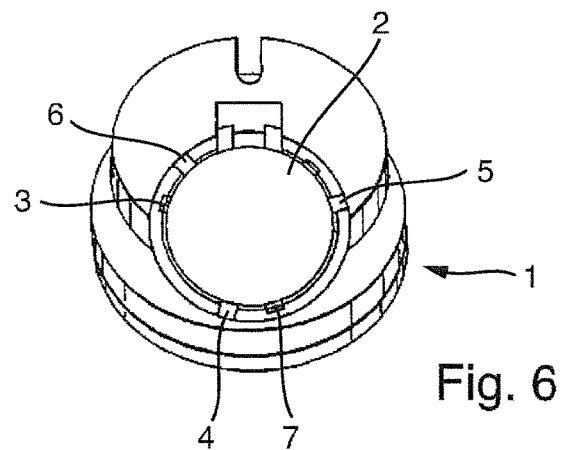
Fig. 6
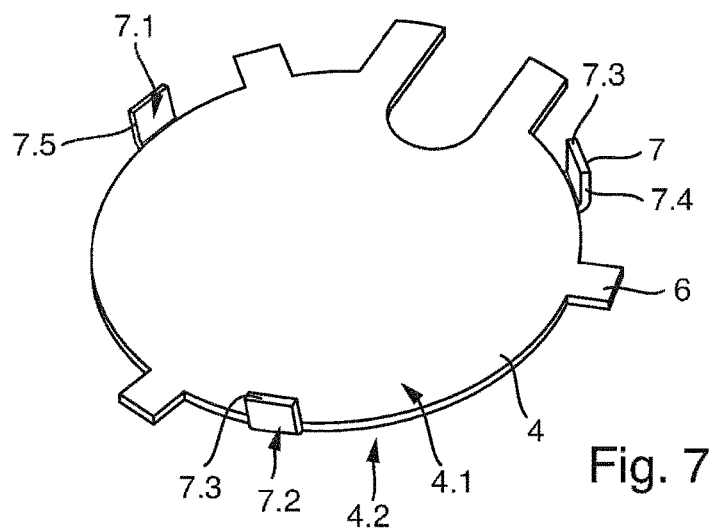
Fig. 7
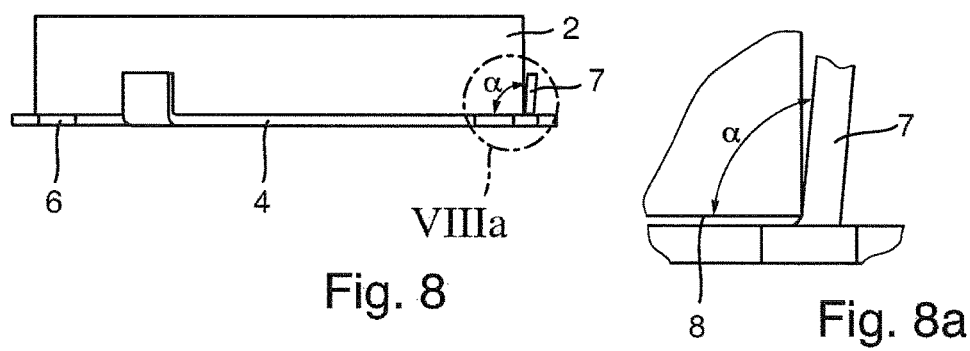
Fig. 8
Fig. 8a

ULTRASONIC TRANSDUCER AND ULTRASONIC FLOW METER

TECHNICAL FIELD

The present invention relates to an ultrasonic transducer and to an ultrasonic flow meter.

BACKGROUND DISCUSSION

In the field of ultrasonic transducer installations, we already know a variety of different arrangements and layer sequences.

The generic European Patent, EP 0 974 814 B1 describes a coupling element with a support or contact area that has a recess to receive a piezoelectric element. A metal disk is arranged between the coupling element and the piezoelectric element. This metal element is glued onto a plane at an incline to the support, where the former is simultaneously the base surface of the recess. For reasons of centering and securing against lateral movement of the piezoelectric element, the metal disk has angled metal sheet elements that protrude from the level of the metal disk. This construction has proved its fundamental worth and stands out especially because of its high-temperature alternating stress. Measuring errors and/or disturbed ultrasound signals may, however, occur if the piezoelectric element does not rest planar on the metal disk, but instead is supported on the bending edges of the angled metal sheet elements.

SUMMARY OF THE INVENTION

Starting from EP 0 974 814 B1, it is therefore an object of this invention to provide a metal disk that causes a low degree of disruption to ultrasound signals.

The invention completes this task by providing an ultrasonic transducer or an ultrasonic flow meter.

The ultrasonic transducer according to the invention comprises a coupling element that has a first recess.

A coupling element for an ultrasonic transducer according to the invention has a first recess. This recess is, for example, a slanted drilling designed as a blind hole. At its end, the recess preferably shows a base surface. This base surface is preferably mainly plain, but may have fluting, stampings and the like to increase the surface and to provide better attachment for a potting compound to be applied to the base surface. The above-mentioned first recess is intended for the reception of a piezoelectric element. The ultrasound signal is fed into the above-mentioned base surface, especially vertically to the base surface after it has been generated by a piezoelectric element and possibly been transferred to the coupling element via other intermediate layers such as, for example, a metal disk.

At least one intermediate layer is arranged between the piezoelectric element and the coupling element according to the invention. This intermediate layer comprises a metal disk.

The metal disk has retaining elements according to the invention, each with a) a first segment that is on the same level as the metal disk and radially protrudes from the circumference of the metal disk, and b) a second segment that joins the first segment and protrudes from the level of the metal plate and is connected to the first segment.

The segmental distribution of the retaining elements of the metal disk reduces the danger of tilting for the piezoelectric element on the metal disk, especially during the production of the ultrasonic transducer.

The retaining elements may advantageously fulfill two functions in such a way that they support the metal disk in the recess on the edge side and also prevent lateral movement of the piezoelectric element arranged on the metal disk.

It is an advantage if the second segment has two surfaces and three edge surfaces, with one of the edge surfaces forming an angle of 90° (±5°) together with the metal disk. The edge surface advantageously serves as a lateral stop for the piezoelectric element against the respective retaining segment.

An edge surface on the second segment facing the piezoelectric element may especially feature a protrusion. This protrusion in a particularly advantageous way prevents any tilting of the piezoelectric element when it is placed on the metal disk, e.g. during assembly.

Alternatively or additionally, one edge surface pointing toward the piezoelectric element or a part of the edge surface of the second segment may be tilted toward the piezoelectric element in such a way that the angle formed between the edge surface or the part of the edge surface and the metal disk or a plane parallel to it is less than 90°, especially between 70-85°. This version also allows improved assembly of the piezoelectric element on the metal disk.

It is an efficient procedure during production if two retaining elements each, offset by 180°, have a bending edge at the transition between the first and the second segment that runs on a common line through the center of the disk. This means that fewer bending processes are required to shape the metal disk, since two second segments of the retaining elements may always be formed in one bending process.

In order to allow an ideal, especially anechoic, connection of the metal disk to the coupling body, a λ/4 adaption layer may be arranged between the metal disk and the coupling element. The connection so far consisted of glue. The adaption layer mentioned above in contrast to this has a layer thickness that corresponds to a quarter of the wave length of the ultrasound signal in the material of the adaption layer, wherein the layer thickness may also deviate by ±25% from this value depending on the acoustical requirements on the bandwidth, in contrast to a typical glue layer with a layer thickness of 0.02 . . . 0.2 mm.

According to the invention, an ultrasonic transducer is used in an ultrasonic flow meter working according to the transit time difference measuring principle. A respective ultrasonic flow meter to determine the flow velocity or the volume flow of a measuring medium with a measuring tube has at least two ultrasonic transducers for this purpose arranged along the length of the measuring tube, with each ultrasonic transducer having a coupling body with a contact area where a generated ultrasound signal may be transferred into the measuring tube or into the measuring media, or received there.

BRIEF DESCRIPTION OF THE DRAWINGS

In the following, the subject matter of the invention is described in detail based on several embodiment examples in the attached illustrations. They show:

FIG. 3 is a lateral view of a second embodiment variant of a metal disk according to the invention to be used in an ultrasonic transducer;

FIG. 3a is a detailed view of the metal disk with piezoelectric element;

FIG. 3b is a detailed view of the metal disk with piezoelectric element;

FIG. 4 is a top view of the metal disk with piezoelectric element;

FIG. 5 shows the positioning of the metal disk in an ultrasonic transducer;

FIG. 6 is a sectional view of an ultrasonic transducer as known from EP 0 974 814 B1;

FIG. 7 is a top view of the metal disk used in EP 0 974 814 B1;

FIG. 8 is a lateral view of the metal disk used in EP 0 974 814 B1; and

FIG. 8a is a detailed view of the lateral view of FIG. 8.

DETAILED DISCUSSION IN CONJUNCTION WITH THE DRAWINGS

Figure 1:
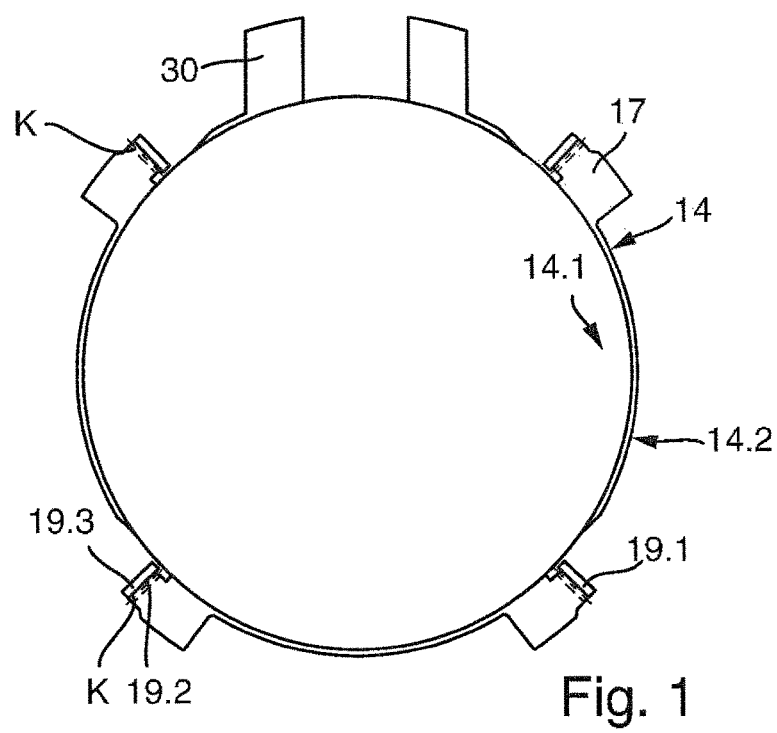
FIG. 1 is a perspective view of a first embodiment variant of a metal disk according to the invention to be used in an ultrasonic transducer.

FIG. 6 shows an ultrasonic transducer 1 that is generally known and described in EP 0 974 814 B1 and whose disclosure is fully incorporated by reference in the context of this invention.

The ultrasonic transducer 1 has an arrangement with a piezoelectric element 2 and a metal disk 4. The ultrasonic transducer also has a coupling element 3. This coupling element 3 is often also referred to as a coupling body. The coupling elements are frequently designed as a wedge, and experts therefore refer to a coupling wedge.

The coupling element is also designed as a coupling wedge in this exemplary embodiment. In the following, the form and function of the coupling element shall be explained in more detail.

The basic shape of the coupling element is cylindrical with a shell surface and two base surfaces. One of the two base surfaces is angled.

In contrast to the coupling elements that are already known, the coupling element according to the invention has a special recess 5 in the shape of a slanted drilling into which the piezoelectric element 2 may be fixed.

The recess 5 arranged in the coupling element 3 in the present exemplary embodiment is, for example, a cylindrical depression with a circular base area that is covered in FIG. 6 by the piezoelectric element 2 and the metal disk 4. Depending on the shape of the piezoelectric element, however, other geometric shapes, such as a cuboid depression and suchlike may be considered. The base areas of those depressions and/or recesses are, for example, designed as squares or rectangles. At the base area of the recess, the main share, i.e. more than 50% of the ultrasound signal generated by the piezoelectric element is introduced into the coupling element. At the same time, the angle in the base area of the recess defines the entrance angle into the measuring medium.

The recess 5 therefore in any case has at least one base area, and preferably one edge area that is at least in part limited by the coupling element.

The metal disk 4 has a lower surface 4.2 facing the coupling element 3 and an upper surface 4.1 facing the piezoelectric element. The lower surface is, for example, glued to the coupling element 3 and/or the base area for this.

Based on FIG. 7 & FIG. 8, the form of the already known metal disk 4 shall now be described in greater detail.

This metal disk 4 has three metal sheet segments 6 that are offset against each other on the metal disk 4 by approx. 120° each. Those metal sheet segments 6 are arranged on the same level as the metal disk 4 and protrude radially from the outside circumference of the circular metal disk 4. They are used as spacers for the metal disk to the edge or to the edge side of the recess 5 so that the metal disk 4 is centered in the recess 5.

The metal disk 4 additionally features retaining elements 7 to position and center the piezoelectric element 2. These three retaining elements 7 are each offset against each other by approx. 120°. They have two surfaces 7.1, 7.2 and three edge surfaces 7.3, 7.4, 7.5. The retaining elements 7 are bent out of the level of the metal disk 4. They are bent toward the direction of the metal disk and define a bending angle $\alpha$ of approx. 90°. However, regarding FIG. 8a, one can see that the bending angle $\alpha$ which is enclosed by a surface 7.2 of the metal sheet segment and the upper surface 4.1 metal disk 4 does not encompass an ideal angle of 90°, but is instead greater than 90°, for example 92°.

An ideal bending angle of 90° is difficult to realize in production. As can be seen in FIG. 8a—it may therefor happen that the piezoelectric element 2 is not supported on the lower surface 4.1 of the metal disk 4, but on the angled retaining element 7. The cavity 8 generated between the piezoelectric element 2 and the metal disk 4 may partly be in a range between 0.2 and 0.5 mm and is the reason for a measuring error.

FIG. 1 shows a metal disk 14 and a piezoelectric element 12 of an ultrasonic transducer according to the invention that prevents the generation of a measuring error of the type described above. The metal disk shows an upper surface 14.1 and a lower surface 14.2, with the piezoelectric element being directly or indirectly positioned on the upper surface, through adaption material, e.g. coupling grease.

The problem is solved by a new design of the retaining element 17.

The functions of the metal sheet segments 6 and the retaining elements 7 of FIG. 6-8 are furthermore united in a single retaining element 17.

For this purpose, the retaining element 17 has a first segment 18 that is on the same level as the metal disk 14 and radially protrudes from the circumference of the metal disk 14.

In addition, the retaining element 17 has a second segment 19 that protrudes from the level of the metal plate. This second segment 19 has two surfaces 19.1 and 19.2 as well as three edge surfaces 19.3, 19.4 and 19.5.

In this, one of the edge surfaces 19.3 of the second segment 19 preferably forms an angle $\beta$ of 90° with the upper surface 14.1 of the metal disk 14. This is, however, only one exemplary embodiment. A different shape selected for the second segment may serve to create different edge surfaces, too.

The second segment 19 preferably has protrusions 20 that protrude from an edge surface 19.3 of the second segment 19 in the direction of the piezoelectric element 2.

The retaining elements 17 on the one hand serve to center the metal disk within the recess and to position and center the piezoelectric element 12 on the metal disk 14 itself. The retaining disks 17 thus take on a compact double function, namely the function of the metal sheet segments 6 and the retaining elements 7 of the metal disk as shown in FIG. 6-8.

The shaping of the metal disk may be done using procedures suitable for mass production—especially punching or laser processing and bending.

Figure 2:
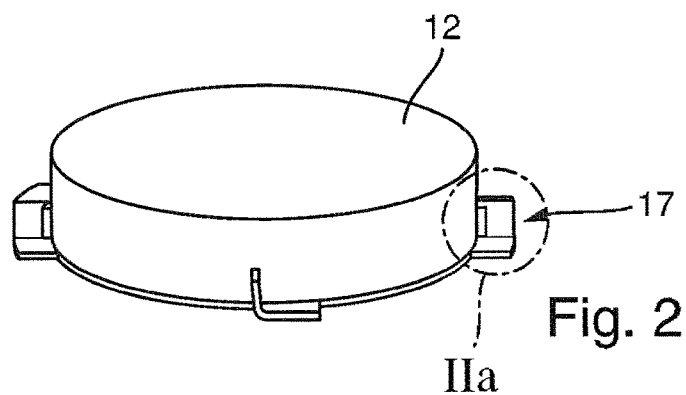
FIG. 2 is a top view of the metal disk with piezoelectric element.
Figure 2A:
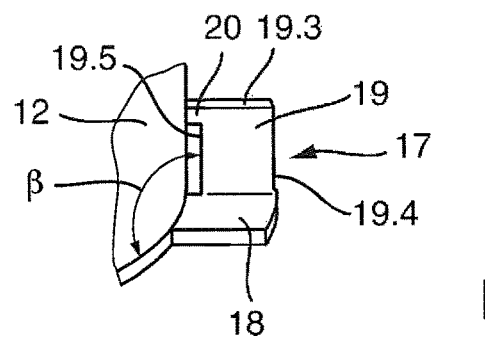
FIG. 2a is a detailed view of the metal disk with piezoelectric element.

As shown in FIG. 2, the retaining elements 17 are arranged with an offset of 90° along the outer circumference of the metal disk. Depending on the number of retaining elements 17, a generally regular distribution of the retaining elements 17 along the circumference of the metal disk 14 is preferred. If three retaining elements are used, for example, an offset of 120° is preferred.

FIG. 3 shows another preferred embodiment variant of a metal plate 24 of an ultrasonic transducer according to the invention with other retaining elements 17a.

In contrast to FIGS. 1-2, however, the edge surface 21.5 of the second segment 21 are tilted toward the piezoelectric element 22, resulting in the edge surfaces to run toward the piezoelectric element 22. This results —as for the protrusions 20 of FIG. 2 —in retention of the piezoelectric element against lateral movement on the metal plate. The small support area of the tilted edge surfaces 21.5 in the exemplary embodiment of FIGS. 3, 3a and 3b and the protrusions 20 of the exemplary embodiment from FIG. 2 advantageously reduce any transfer of acoustic pulses on the edge surface of the metal disk. In addition, the danger of tilting the piezoelectric element during assembly is reduced.

FIG. 5 and FIG. 6 show an ultrasonic transducer according to the invention with a recess and a metal plate 14 positioned inside —as described in FIGS. 3 & 4 and a piezoelectric element 22 positioned on it.

In one coupling element 23, there is a recess 25 included. This latter is cylindrically shaped. The recess has an edge surface and a final base area that is hidden in the present exemplary embodiment by the piezoelectric element 22 and the metal disk 24 underneath. At the base area, the main share, i.e. more than 50% of the ultrasound signal generated by the piezoelectric element is introduced into the coupling element. At the same time, the angle in the base area defines the entrance angle into the measuring medium.

The coupling element has a contact area 33 in a manner that is basically known on which an ultrasound signal generated by the piezoelectric element is transferred into a measuring medium or a measuring tube of an ultrasonic flow meter.

In a particularly preferred exemplary embodiment, a λ/4 adaption layer 26 of potting material is arranged between the metal disk 24 and the coupling element 23. This material with acoustic impedance between that of the metal plate and the coupling body advantageously prevents any ultrasound signal echo. The metal disk is particularly preferred in a position on the stops 27.

An alternative, but less preferred embodiment variant is gluing the metal disk to the coupling body.

The coupling body 23 may consist of a high-temperature thermoplastic material such as, e.g. an unfilled polyetherimide (PEI) as available under the trade name Ultem 1000.

As can be seen in FIG. 5, a coupling element may advantageously have a radial groove 32 on its outer circumference to receive an O ring in order to tightly seal the ultrasonic transducer in a bore hole of a container or a measuring tube of a flow meter. This may also be done for an ultrasonic transducer according to the invention.

The ultrasonic transducer may, as stated initially, e.g. be inserted into a measuring tube of an ultrasonic flow meter containing a flowing measuring medium (powder, liquid, gas, steam) whose volume flow and/or flow velocity is/are to be measured. For this purpose, two ultrasonic transducers are inserted into, set on or clipped onto the measuring tube at a distance to each other and alternately switched to be an ultrasound emitter and an ultrasound receiver.

Usually, each ultrasonic transducer has a coupling body 23 as described above with a contact area 23a on which an ultrasound signal generated by the piezoelectric element 22 is transferred or received from the coupling body 23 into the measuring tube or the measuring medium.

The transit time difference of the signals sent allows, for example, the electronic calculation of the flow velocity and/or the volume flow according to basically known principles.

The piezoelectric element may be shaped as a disk and preferably consists of a ceramic piezoelectric material, such as, for example, a PZT-5 standard soft ceramic.

The thickness of the metal disk is preferably at most equal to a quarter of the wavelength the ultrasound signal emitted by the piezoelectric element has in the metal disk. The latter preferably consists of pure aluminum. It may, however, also consist of titanium, stainless steel, brass or lead or alloys.

The best suited potting compounds are especially liquid-setting epoxy resins. An epoxy resin densely filled with aluminum oxide may in particular be used, with more than 50% in weight aluminum oxide shares, especially 70-80% in weight. As an alternative to potting compounds, melts may be used to link the metal disk to the coupling body. They are introduced at a temperature that is higher compared to the operating temperature of the sensor and solidify, or they may consist of a permanently elastic potting compound mixed of small particles compared to the wave length. This also reduces the thermal stress.

From the sequence of the individual layers and components follows an impedance gradient for the ultrasound signal until it exits from the ultrasonic transducer.

The impedances of the respective layers and components of the ultrasonic transducer are stated in MKS units and are as follows:

piezoelectric element: Z=18-30 MRayl;
metal disk (aluminum disk): Z=less than 18 MRayl, especially 10-17 MRayl;
adaption layer and/or potting compound (epoxy resin filled with $Al_2O_3$): 5-9 MRayl, especially 6.5-7.5 MRayl;
PEI coupling element: less than 4 MRayl, especially 2.5-3.5 MRayl.

Due to a more adapted impedance transition, one advantage is the achievement of improved signal strength for the ultrasound signal.

In addition, the layer sequence also results in a gradient with regard to the thermal expansion coefficient in the sequence of the components, which allows the ultrasonic transducer to withstand an improved temperature change continuity and thus can be used for measurements in higher temperature ranges without the material layers being subjected to high tensile or shear stress.

In addition to the retaining elements 17 or 20, the metal plate of the embodiment example preferably also has positioning segments 30 that engage in a free area 31 on the edge side of the cylindrical recess 25 and there function as anti-twist protection of the metal disk 14 inside the recess 25.

The invention claimed is:
1. An ultrasonic transducer, comprising:
a piezoelectric element;
a coupling element with a first recess; and
an intermediate layer, wherein:

said first recess is intended to receive said piezoelectric element that introduces an ultrasound signal into said coupling element;

said intermediate layer is arranged between said piezoelectric element and said coupling element and comprises a metal disk, said metal disk has retaining elements.

2. The ultrasonic transducer according to claim 1, wherein:

said retaining elements support said metal disk in said recess on an edge side and that said retaining elements prevent any lateral movement of said piezoelectric element positioned on said metal disk.

3. The ultrasonic transducer according to claim 1, wherein:

a second segment has two surfaces and three edge surfaces; wherein:

one of said edge surfaces encloses an angle of 90° (±5°) (β) together with said metal plate.

4. The ultrasonic transducer according to claim 3, wherein:

said edge surface of said second segment pointing toward said piezoelectric element comprises a protrusion.

5. The ultrasonic transducer according to claim 3, wherein:

one edge surface pointing toward said piezoelectric element or a part of the edge surface of said second segment is tilted toward said piezoelectric element that the angle (β) formed between the edge surface or the part of the edge surface and said metal disk or a plane parallel to it is less than 90°, especially between 70-85°.

6. The ultrasonic transducer according to claim 1, wherein:

two of said retaining elements offset each by 180° feature a bending edge at a transition between a first and a second segment that follows a common line running through a center of said metal disk.

7. The ultrasonic transducer according to claim 1, wherein:

a λ/4 adaption layer is arranged between said metal disk and a coupling body.

8. An ultrasonic flow meter to determine the flow velocity or a volume flow of a measuring medium with a measuring tube and at least two ultrasonic transducers according to claim 1 arranged along a length of said measuring tube, with each ultrasonic transducer having a coupling body with a contact area where a generated ultrasound signal may be transferred into said measuring tube or into a measuring media, or received there.

* * * * *